(12) United States Patent
Sakashita

(10) Patent No.: US 6,363,042 B1
(45) Date of Patent: Mar. 26, 2002

(54) OPTICAL DISK DRIVE HAVING MEANS FOR PREVENTING INNER REFERENCE CLOCK SIGNAL IN PLL CIRCUIT FROM BEING DISTURBED WHEN DEFECTIVE PORTION IS READ

(75) Inventor: Mitsunori Sakashita, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/391,866

(22) Filed: Sep. 8, 1999

(30) Foreign Application Priority Data

Sep. 11, 1998 (JP) .............................. 10-258677

(51) Int. Cl.[7] .................................. G11B 7/00
(52) U.S. Cl. .................................. 369/47.28; 369/53.15
(58) Field of Search .................... 369/47.14, 47.18, 369/47.28, 53.12, 53.15, 15.17, 53.34, 53.35, 59.17

(56) References Cited

U.S. PATENT DOCUMENTS

| 4,974,221 A | * 11/1990 | Hosoya et al. | ............ 369/44.32 |
| 5,448,543 A | 9/1995 | Mizokami et al. | |
| 5,903,748 A | 5/1999 | McCollough et al. | |

FOREIGN PATENT DOCUMENTS

| EP | 0 409 516 A2 | 1/1991 |
| JP | 64002157 | 6/1989 |
| JP | 10-69734 | 3/1998 |

OTHER PUBLICATIONS

Kawamae, O. et al.: "A High Speed Signal Processing For Quadruple Speed CD–ROM", IEEE Transactions on Consumer Electronics, vol. 40, No. 3, pp. 679–684 (1994).

* cited by examiner

Primary Examiner—Nabil Hindi
(74) Attorney, Agent, or Firm—Brinks Hofer Gilson & Lione

(57) ABSTRACT

An optical disk drive includes a voltage-controlled oscillator for generating an inner reference clock signal; a data extraction section for extracting data from a reproduction (RF) signal read from a disk medium with the use of the inner reference clock signal; a phase comparator for comparing the RF signal in phase with the inner reference clock signal to send a phase error signal to the voltage-controlled oscillator; a frequency comparator for comparing in frequency the RF signal with the inner reference clock signal to send a frequency error signal to the voltage-controlled oscillator through a switching unit; and a defect detection section for detecting a defective portion on the disk medium from the envelope of the RF signal to output a defect detection signal. The switching unit is switched so as to break a connection between the voltage-controlled oscillator and the frequency comparator when the defect detection signal is output.

3 Claims, 3 Drawing Sheets

OPTICAL DISK DRIVE HAVING MEANS FOR PREVENTING INNER REFERENCE CLOCK SIGNAL IN PLL CIRCUIT FROM BEING DISTURBED WHEN DEFECTIVE PORTION IS READ

BACKGROUND OF THE INVENTION

1. Field of the Invention

The present invention relates to optical disk drives, and more particularly, to an optical disk drive provided with means for preventing an inner reference clock signal from being disturbed due to a partial missing of a read reproduction signal caused by a defect on a disk medium.

2. Description of the Related Art

In optical disk drives for reproducing information recorded on a disk medium such as a DVD-ROM, in general, to extract data from a bit reproduction (RF) signal (clock signal mixed with data) read from the disk medium, an inner reference clock signal generated inside the optical disk drives is synchronized in phase and in frequency with the RF signal and the data is extracted with the use of a window signal formed from the inner reference clock signal.

In this case, such an optical disk drive is provided with a phase-locked loop (PLL) circuit having a voltage-controlled oscillator (VCO), a phase comparator, and a low-pass filter (LPF). In addition, a frequency comparator is also provided in order to speed up the synchronization of the PLL circuit to the RF signal and to adjust the inner reference clock signal so as to be always in the best condition. In this optical disk drive, when the frequency of a read RF signal varies, the frequency change is detected by the frequency comparator, a frequency error signal is sent to the PLL circuit, and the frequency of the inner reference clock signal is adjusted to the best condition. In this way, the synchronization of the inner reference clock signal with the RF signal is sped up and then data can be accurately extracted.

FIG. 3 is a block diagram showing an example structure of a main section of a known optical disk drive performing such an operation.

As shown in FIG. 3, this known optical disk drive is provided with a VCO 31 constituting a controllable free-running oscillator, a phase comparator 32, an LPF 33, a frequency comparator 34, a data-latch circuit 35, a window-signal generation section 36, an RF-signal input terminal 37, a data output terminal 38, and an inner-reference-clock-signal output terminal 39. In this case, the VCO 31, the phase comparator 32, and the LPF 33 form a PLL circuit 30.

One input end of the VCO 31 is connected to the output end of the LPF 33, the other input end is connected to the output end of the frequency comparator 34, and the output end is connected to the input end of the window-signal generation section 36 and to the inner-reference-clock-signal output terminal 39. One input end of the phase comparator 32 is connected to an RF-signal input terminal 37, the other input end is connected to the output end of the VCO 31, and the output end is connected to the input end of the LPF 33. One input end of the frequency comparator 34 is connected to the RF-signal input terminal 37 and the other input end is connected to the output end of the VCO 31. The latch end of the data-latch circuit 35 is connected to the output end of the window-signal generation signal 36, the input end is connected to the RF-signal input terminal 37, and the output end is connected to the data output terminal 38.

The known optical disk drive having the above structure schematically operates in the following way.

The RF signal obtained by reading a disk medium is sent to the phase comparator 32, the frequency comparator 34, and the data-latch circuit 35 through the RF-signal input terminal 37. The phase comparator 32 compares the inner reference clock signal generated by the VCO 31 with a clock signal included in the RF signal, generates a phase error signal indicating a phase difference therebetween, and sends it to the LPF 33. The LPF 33 smoothes the phase error signal, converts it to a phase error voltage, and sends the voltage to the VCO 31. The frequency comparator 34 compares in frequency the inner reference clock signal generated by the VCO 31 with the clock signal included in the RF signal, generates a frequency error signal indicating a frequency difference therebetween, and sends it to the VCO 31.

In the VCO 31, the phase of the inner reference clock signal is adjusted in response to the sent phase error voltage, and the frequency of the inner reference clock signal is adjusted so as to be a predetermined frequency in response to the sent frequency error signal. In this way, the inner reference clock signal output from the VCO 31 is adjusted so as to be synchronized in phase and in frequency with the clock signal included in the RF signal.

The inner reference clock signal output from the VCO 31 is sent to the inner-reference-clock-signal output terminal 39, and is also converted to a window signal to be generated when data in the RF signal reaches, in the window-signal generation section 36, and is sent to the data-latch circuit 35. The data-latch circuit 35 reads the data when the window signal is sent, namely, when the data in the sent RF signal reaches, and sends the read data to the data output terminal 38.

In the known optical disk drive, the PLL circuit 30 formed of the VCO 31, the phase comparator 32, and the LPF 33 synchronizes in phase the inner reference clock signal output from the VCO 31 with the clock signal included in the RF signal. In a closed control loop formed of the VCO 31 and the frequency comparator 34, the frequency of the inner reference clock signal output from the VCO 31 is adjusted so as to promptly become equal to the frequency of the clock signal included in the RF signal.

When the known optical disk drive reads a disk medium having a defect described later, in other words, when the defective portion on the disk medium is read, such as a scrape and a scratch on the reading surface of the disk medium, a bit defect and a missing bit (interruption) on the bit recording surface of the disk medium, or a stain (black dot), such as that formed by a magic marker, which is stuck to the reading surface of the disk medium and does not reflect light, an RF signal having an inaccurate clock signal is output or an RF signal having no clock signal is output. Therefore, the frequency error signal output from the frequency comparator 34 becomes extremely large or extremely small, and the inner reference clock signal output from the VCO 31 has an inappropriate frequency largely deviated from the appropriate frequency. When the frequency of the inner reference clock signal output from the VCO 31 is largely deviated from the appropriate frequency, phase synchronization is not performed in the PLL 30 and the inner reference clock signal output from the VCO 31 becomes runaway.

Once the inner reference clock signal goes runaway, even when a normal RF signal having the clock signal arrives again when the defective portion on the disk medium has been read, it takes a long time for the inner reference clock signal output from the VCO 31 to have the appropriate frequency.

As described above, in the known optical disk drive, when a disk medium having a defect is read, the frequency of the inner reference clock signal output from the VCO 31 is temporarily deviated from the appropriate frequency greatly, and during that period, data in the RF signal cannot be read by the data-latch circuit 35.

To solve this drawback, there has already been proposed a disk drive in which a missing portion of an RF signal is detected according to the envelope of the RF signal, and when the missing portion is detected, the frequency of the inner reference clock signal output from the VCO is maintained at the frequency used immediately before the missing portion is detected to prevent the frequency of the inner reference clock signal from being greatly deviated; and a disk drive, as disclosed by the Unexamined Patent Publication No. Hei-10-69734, in which the switching means is opened due to a missing detection signal obtained by detecting a missing portion of the RF signal to maintain the frequency of the inner reference clock signal output from the VCO at the frequency used immediately before the missing detection signal is sent, by the use of an holding circuit, and the time constant of the holding circuit is switched when the missing detection signal is sent to narrow the capture range of the PLL circuit.

In the above two disk drives proposed, however, only the PLL circuit is used to control the frequency of the inner reference clock signal output from the VCO. The disk drive does not operate such that the frequency and the phase of the inner reference clock signal are adjusted by the use of the frequency comparator and the PLL circuit.

Since the technical means employed by the two proposed disk drives, that is, phase-synchronization-releasing preventing means for the PLL circuit, cannot be applied as is to a disk drive in which the frequency and the phase of the inner reference clock signal are adjusted by the use of the frequency comparator and the PLL circuit, new technical means has been demanded.

SUMMARY OF THE INVENTION

Accordingly, it is an object of the present invention to provide an optical disk drive which allows the frequency and the phase of an inner reference clock signal to be promptly compensated for their shifts after a defective portion on a disk medium has been read when the frequency and the phase of the inner reference clock signal are adjusted with the use of a frequency comparator and a PLL circuit.

The foregoing object is achieved according to the present invention through the provision of an optical disk drive including an voltage-controlled oscillator (VCO) for generating an inner reference clock signal; a data extraction section for extracting data from a reproduction (RF) signal read from a disk medium with the use of the inner reference clock signal; a phase comparator for comparing in phase the RF signal with the inner reference clock signal to send a phase error signal to the VCO; a frequency comparator for comparing in frequency the RF signal with the inner reference clock signal to send a frequency error signal to the VCO through a switching unit; and a defect detection section for detecting a defect on the disk medium from the envelope of the RF signal to output a defect detection signal, wherein the switching unit is switched so as to break a connection between the VCO and the frequency comparator when the defect detection signal is output.

The optical disk drive may be configured such that the switching unit is a controllable switch in which a make and a break are switched by the defect detection signal.

The optical disk drive may be configured such that the switching unit includes a controllable switch in which a make and a break are switched by the defect detection signal and a voltage holding unit connected to one of movable contacts of the controllable switch, for holding the voltage level of the frequency error signal, and the voltage held by the voltage holding unit is sent to the VCO through the controllable switch when the defect detection signal is output.

According to the present invention, when a defect on the disk medium is read and the defect detection section outputs a defect detection signal, the switching unit is opened with the use of the defect detection signal to break a connection between the VCO and the frequency comparator, and the transmission of the frequency error signal to the VCO is blocked. Therefore, even if a large disturbance is generated in the frequency error signal output from the frequency comparator due to missing of the clock signal in the RF signal or inaccuracy of the clock signal when the defective portion is read on the disk medium, the disturbed frequency error signal is not sent to the VCO and the frequency of the inner reference clock signal output from the VCO is maintained almost at the same state as that used immediately before the defect detection signal is output.

In addition, according to the present invention, when the defective portion of the disk medium has been read and the output of the defect detection signal from the defect detection section is stopped, the switching unit is again closed to connect the VCO to the frequency comparator, and an RF signal having the normal clock signal is sent to the frequency comparator. Therefore, an appropriate frequency error signal output from the frequency comparator is sent to the VCO, and the inner reference clock signal output from the VCO is immediately re-synchronized in frequency with the clock signal in the RF signal. The data extraction section can extract data from the RF signal. A period of time from when the defective portion of the disk medium has been read to when data is extracted is greatly reduced compared with this type of known apparatuses.

DESCRIPTION OF THE PREFERRED EMBODIMENT

Figure 1:
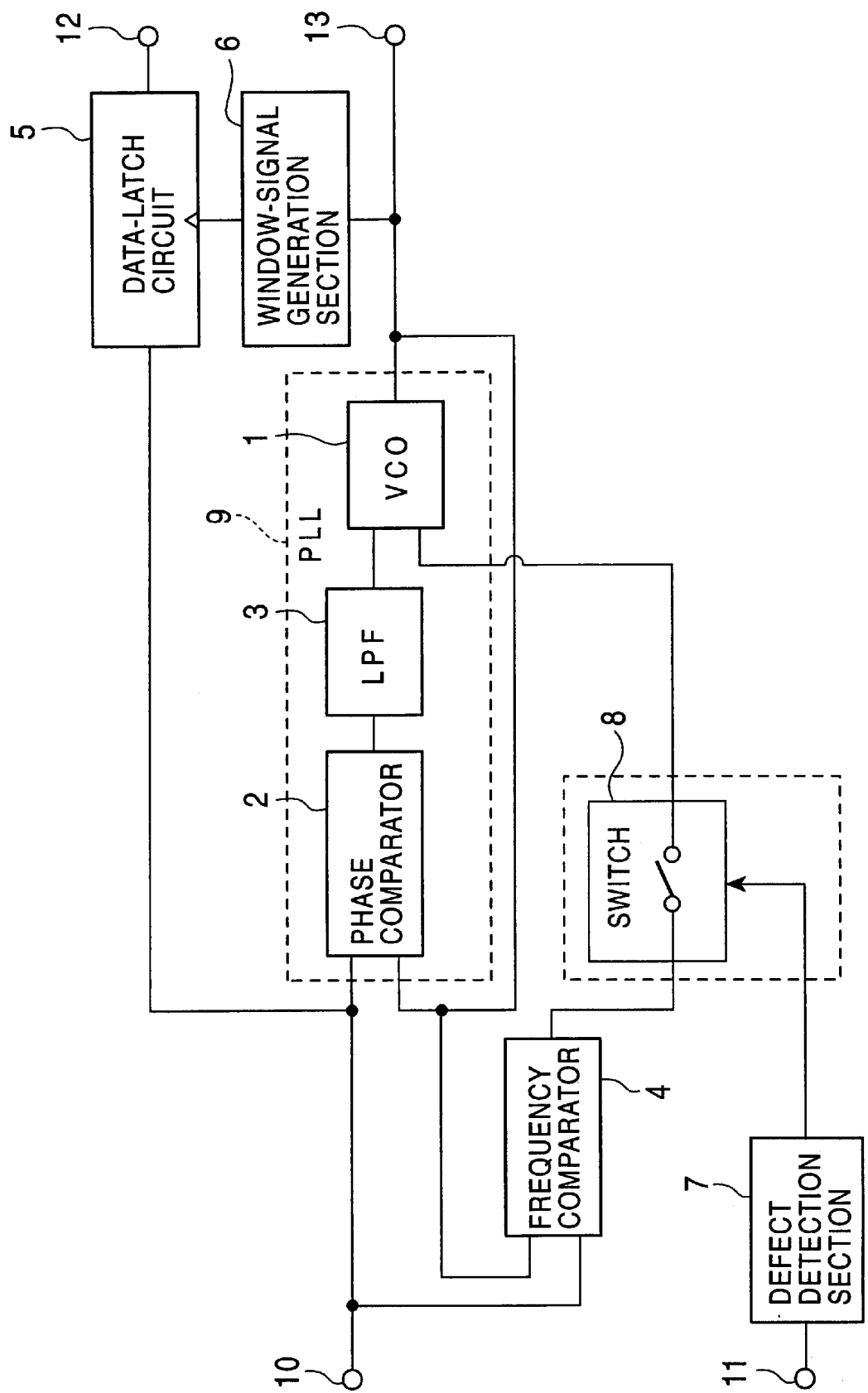
FIG. 1 is a block diagram of an optical disk drive according to a first embodiment of the present invention.

Embodiments of the present invention will be described below by referring to the drawings.

FIG. 1 is a block diagram showing the structure of a main section of an optical disk drive according to a first embodiment of the present invention.

In FIG. 1, the optical disk drive according to the present embodiment is provided with a voltage-controlled oscillator (VCO) 1 constituting a controllable free-running oscillator, a phase comparator 2, a low-pass filter (LPF) 3, a frequency comparator 4, a data-latch circuit 5, a window-signal generation section 6, a defect detection section 7, a controllable switch 8, an RF-signal input terminal 10, an RF-signal-envelope input terminal 11, a data output terminal 12, and an inner-reference-clock-signal output terminal 13. In this case, the VCO 1, the phase comparator 2, and the LPF 3 form a phase-locked loop (PLL) 9. The defect detection section 7 detects a large change in an RF-signal envelope to output a defect detection signal when a defective portion on a disk medium (not shown), such as a scratch and a stain, is read. The defect detection section 7 is used to hold a servo system when the defect detection signal is output.

One input end of the VCO 1 is connected to the output end of the LPF 3, the other input end is connected to the output end of the switch 8, and the output end is connected to the input end of the window-signal generation section 6 and to the inner-reference-clock-signal output terminal 13. One input end of the phase comparator 2 is connected to an RF-signal input terminal 10, the other input end is connected to the output end of the VCO 1, and the output end is connected to the input end of the LPF 3. One input end of the frequency comparator 4 is connected to the RF-signal input terminal 10, the other input end is connected to the output end of the VCO 1, and the output end is connected to the input end of the controllable switch 8. The latch end of the data-latch circuit 5 is connected to the output end of the window-signal generation section 6, the input end is connected to the RF-signal input terminal 10, and the output end is connected to the data output terminal 12. The input end of the defect detection section 7 is connected to the RF-signal-envelope input terminal 11 and the output end is connected to the control end of the controllable switch 8.

The optical disk drive according to the present embodiment having the above structure schematically operates in the following way.

A case in which the disk medium (not shown) has no defective portion such as a scratch or a stain and an RF signal obtained by reading the disk medium includes a normal clock signal and normal data will be described first.

The RF signal obtained by reading the disk medium is sent to the phase comparator 2, the frequency comparator 4, and the data-latch circuit 5 through the RF-signal input terminal 10. In the same way, an RF-signal envelope obtained when the disk medium is read is sent to the defect detection section 7 through the RF-signal-envelope input terminal 11. The phase comparator 2 receives the inner reference clock signal generated by the VCO 1 and a clock signal included in the RF signal, compares the phases of these signals, generates a phase error signal indicating a phase difference therebetween, and sends it to the LPF 3. The LPF 3 smoothes the sent phase error signal, converts it to a phase error voltage, and sends the voltage to the VCO 1. The frequency comparator 4 receives the inner reference clock signal generated by the VCO 1 and the clock signal included in the RF signal, compares the frequencies of these signals, generates a frequency error signal indicating a frequency difference therebetween, and sends it to the VCO 1 through the controllable switch 8, which is then closed.

In the VCO 1, the phase of the inner reference clock signal to be output is adjusted in response to the sent phase error voltage so as to synchronize in phase with the clock signal included in the RF signal. The frequency of the inner reference clock signal is adjusted so as to synchronize in frequency with the clock signal included in the RF signal in response to the sent frequency error signal. In this way, the inner reference clock signal output from the VCO 1 is adjusted so as to be synchronized in phase and in frequency with the clock signal included in the RF signal.

The inner reference clock signal output from the VCO 1 is directly sent to the inner-reference-clock-signal output terminal 13 to be output to a circuit (not shown) using it, and is also sent to the window-signal generation section 6. When the window-signal generation section 6 receives the RF signal, it generates a window signal having the same width as the period in which data in the RF signal reaches and sends the signal to the data-latch circuit 5. The data-latch circuit 5 receives the RF signal and the window signal, and reads the data in the RF signal while the window signal is being sent. Since the period while the window signal is being sent is identical to the period when the data in the RF signal is being arrived, the data-latch circuit 5 reads the data in the RF signal without missing a part of them, and sends the read data to the data output terminal 12.

A case in which the disk medium has a defective portion such as a scratch or a stain, and the defective portion is read, in other words, an RF signal obtained by reading the disk medium includes a clock signal and data in an inappropriate condition will be described next.

An RF-signal envelope obtained when a defective portion on the disk medium is read is sent to the defect detection section 7 through the RF-signal-envelope input terminal 11. The defect detection section 7 determines that the amplitude of the read part of the defective portion in the sent RF-signal envelope is much smaller than that of the read part of a portion other than the defective portion, and outputs a positive-level or negative-level defect detection signal to the controllable switch 8 during the period in which the read part of the defective portion is being arrived. The controllable switch 8 opens a switch contact which was closed before then to break a connection between the frequency comparator 4 and the VCO 1.

In parallel to the above operation, the RF signal obtained when the defective portion on the disk medium is read is sent to the phase comparator 2, the frequency comparator 4, and the data-latch circuit 5 through the RF-signal input terminal 10.

The phase comparator 2 compares in phase the inner reference clock signal generated by the VCO 1 with an inappropriate clock signal included in the RF signal, and generates a phase error signal indicating a phase difference therebetween. Since the clock signal included in the RF signal has become inappropriate, the amplitude of the phase error signal has abruptly changed from that of the phase error signal obtained before then. When the phase error signal having a changed amplitude passes through the LPF 3, the change in amplitude is absorbed and a phase control voltage having a relatively small change is sent to the VCO 1.

The frequency comparator 4 compares in frequency the inner reference clock signal generated by the VCO 1 with the inappropriate clock signal included in the RF signal, and generates a frequency error signal indicating a frequency difference therebetween. Since the clock signal included in the RF signal has become inappropriate, the amplitude of the frequency error signal has abruptly changed from that of the frequency error signal obtained before then. Since the switch contact of the controllable switch 8 is open at this point of time, the frequency error signal having a greatly changed amplitude is not sent to the VCO 1.

Since the VCO 1 receives only the phase control voltage having a relatively small change and does not receive the frequency control signal having a largely changed amplitude, the phase and the frequency of the inner reference clock signal output therefrom are maintained almost at the same as those of the inner reference clock signal obtained immediately before the defective portion is read.

When the defective portion on the disk medium has been read, the RF signal obtained by reading the disk medium again includes a normal clock signal and normal data. The defect detection section 7 determines that the amplitude of the received RF-signal envelope returns to the previous amplitude, and stops outputting the defect detection signal. Since the transmission of the defect detection signal is stopped, the controllable switch 8 closes the switch contact which was open before then to make a connection between the frequency comparator 4 and the VCO 1.

When the system returns to such a condition, the phase comparator 2 compares in phase the inner reference clock signal generated by the VCO 1 with an appropriate clock signal included in the RF signal, and generates a phase error signal indicating a phase difference therebetween. As in the condition obtained before the defective portion is read, the inner reference clock signal output from the VCO 1 is synchronized in phase with the clock signal included in the RF signal. The frequency comparator 4 compares in frequency the inner reference clock signal generated by the VCO 1 with the appropriate clock signal included in the RF signal, and generates a frequency error signal indicating a frequency difference therebetween. As in the condition obtained before the defective portion is read, the inner reference clock signal output from the VCO 1 is synchronized in frequency with the clock signal included in the RF signal.

As described above, since the optical disk drive according to the present embodiment breaks the connection between the frequency comparator 4 and the VCO 1 while the defective portion on the disk medium is being read, so as not to send a frequency control signal having a greatly changed amplitude to the VCO 1 so that the frequency of the inner reference clock signal output from the VCO 1 does not change greatly; and makes the connection between the frequency comparator 4 and the VCO 1 when the defective portion on the disk medium has been read so as to immediately send an appropriate frequency control signal to the VCO 1, a change in the frequency of the inner reference clock signal output from the VCO 1 becomes small before and after the defective portion on the disk medium is read, and frequency re-synchronization is promptly achieved. When the defective portion on the disk medium has been read, since the frequency re-synchronization of the inner reference clock signal is fast performed, reading of data included in the RF signal can be resumed without taking time.

Figure 2:
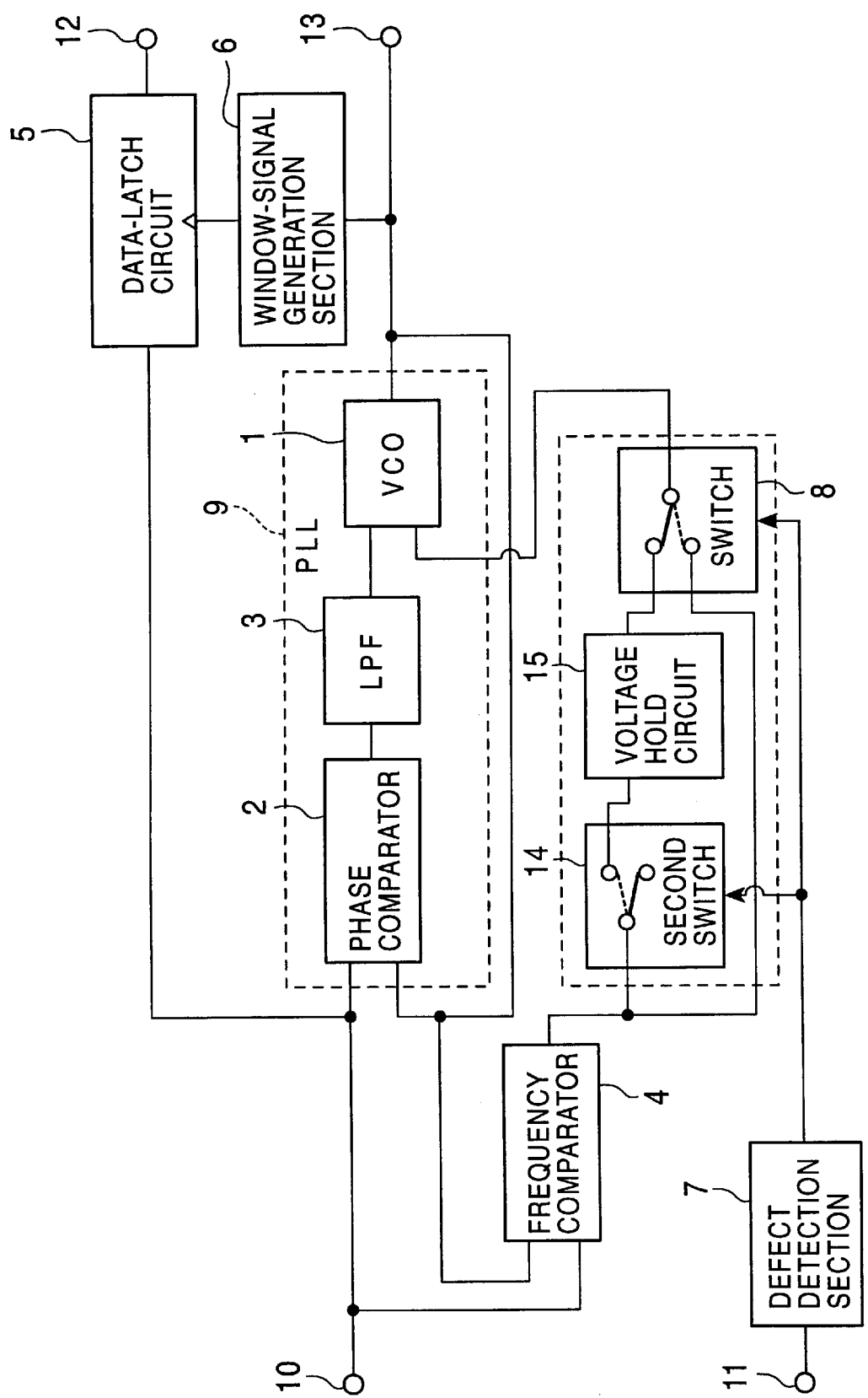
FIG. 2 is a block diagram of an optical disk drive according to a second embodiment of the present invention.
Figure 3:
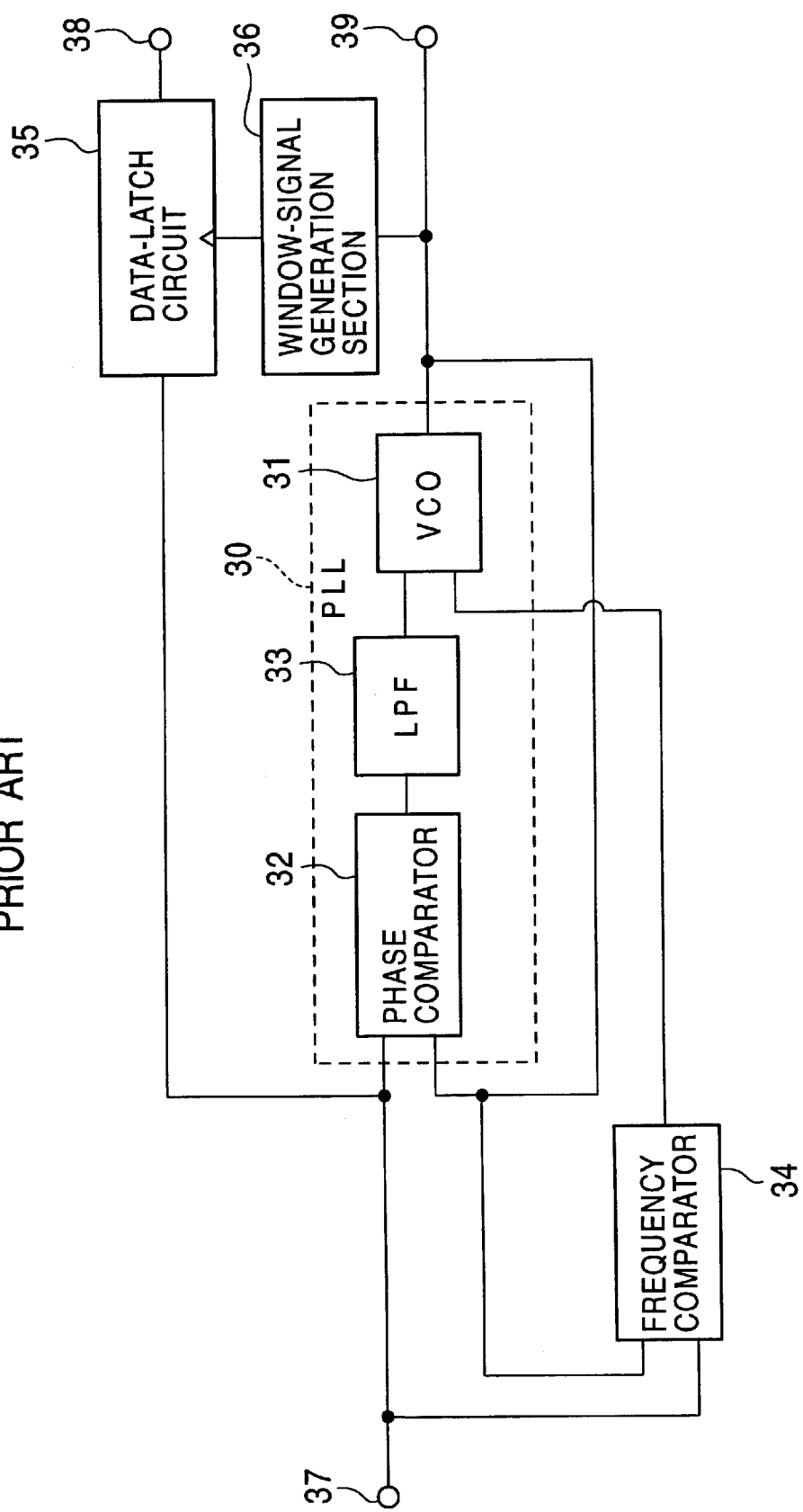
FIG. 3 is a block diagram of a known optical disk drive.

FIG. 2 is a block diagram showing the structure of a main section in an optical disk drive according to a second embodiment of the present invention.

In FIG. 2, the same symbols are assigned to the same structural elements as those shown in FIG. 1.

The second embodiment differs from the first embodiment in structure in that the controllable switch 8 has one circuit with two contacts in the second embodiment whereas the controllable switch 8 has one circuit with one contact in the first embodiment; and the frequency comparator 4 is directly connected to one fixed contact of the controllable switch 8 and the frequency comparator 4 is connected to the other fixed contact of the controllable switch 8 through a second controllable switch 14 and a voltage holding circuit 15 in the second embodiment whereas the frequency comparator 4 is directly connected to the controllable switch 8 in the first embodiment. The second embodiment is the same as the first embodiment in the other points.

In the second embodiment, when a disk medium (not shown) has no defective portion such as a scratch or a stain, and therefor the defect detection section 7 does not output a defect detection signal, the movable contact of the controllable switch 8 is connected to one fixed contact and the movable contact of the second controllable switch 14 is connected to one fixed contact, as shown by dotted lines in FIG. 2, to directly connect the frequency comparator 4 to the controllable switch 8 in the same way as in the first embodiment. On the other hand, when the disk medium has a defective portion such as a scratch or a stain, the defective portion is read, and the defect detection section 7 outputs a defect detection signal, the movable contact of the controllable switch 8 is connected to the other fixed contact and the movable contact of the second controllable switch 14 is connected to the other fixed contact, as shown by solid lines in FIG. 2. With the connection switching, the direct connection between the frequency comparator 4 and the controllable switch 8 is broke, and the controllable switch 8 is connected to the voltage holding circuit 15. The voltage holding circuit 15 always holds the frequency error signal output from the frequency comparator 4 in voltage. When the voltage holding circuit 15 is connected to the VCO 1 through the controllable switch 8, the frequency error signal of the frequency comparator 4 sent to and held in voltage by the voltage holding circuit 15 immediately before the connection is transmitted to the VCO 1.

An operation in the second embodiment to be performed when an RF signal read from the disk medium is sent while the defect detection section 7 does not output a defect detection signal is the same as the operation in the first embodiment to be performed when an RF signal read from the disk medium is sent while the defect detection section 7 does not output a defect detection signal, which has been described.

An operation in the second embodiment to be performed when an RF signal obtained by reading the defective portion on the disk medium is sent while the defect detection section 7 outputs a defect detection signal is the same as the operation in the first embodiment to be performed when an RF signal obtained by reading the defective portion on the disk medium is sent while the defect detection section 7 outputs a defect detection signal, which has been described, except that the frequency of the inner reference clock signal output from the VCO 1 is adjusted by the frequency error signal sent from the voltage holding circuit 15. An operation in the second embodiment to be performed when an RF signal is sent if the defective portion on the disk medium has been read is the same as the operation in the first embodiment to be performed when an RF signal is sent if the defective portion on the disk medium has been read, which has been described.

Since the operations in the second embodiment are almost the same as those in the first embodiment except for very partial points, the same advantages as those obtained in the first embodiment are obtained in the second embodiment. Since the frequency error signal is sent from the voltage holding circuit 15 to the VCO 1 in the second embodiment when the defect detection section 7 outputs a defect detection signal, stability is enhanced against external noise compared with the first embodiment.

A disk medium is not limited to a DVD-ROM in the optical disk drive in the present embodiment. A CD-ROM and a CD-R can also be used.

Neither the controllable switch 8 nor the second controllable switch 14 used in the optical disk drive in the present embodiment is limited to those having the contacts shown in the figure. Any form of switches can be used if they are switched according to whether a defect detection signal is sent or not.

What is claimed is:

1. An optical disk drive comprising:

an voltage-controlled oscillator for generating an inner reference clock signal;

a data extraction section for extracting data from a reproduction signal read from a disk medium with the use of the inner reference clock signal;

a phase comparator for comparing in phase the reproduction signal with the inner reference clock signal to send a phase error signal to said voltage-controlled oscillator;

a frequency comparator for comparing in frequency the reproduction signal with the inner reference clock signal to send a frequency error signal to said voltage-controlled oscillator through switching means; and a defect detection section for detecting a defect on the disk medium from the envelope of the reproduction signal to output a defect detection signal, wherein the switching means is switched so as to break a connection between said voltage-controlled oscillator and said frequency comparator when the defect detection signal is output.

2. An optical disk drive according to claim 1, wherein the switching means is a controllable switch in which a make and a break are switched by the defect detection signal.

3. An optical disk drive according to claim 1, wherein the switching means comprises a controllable switch in which a make and a break are switched by the defect detection signal and voltage holding means connected to one of movable contacts of the controllable switch, for holding the voltage level of the frequency error signal, and the voltage held by the voltage holding means is sent to said voltage-controlled oscillator through the controllable switch when the defect detection signal is output.

* * * * *

UNITED STATES PATENT AND TRADEMARK OFFICE
CERTIFICATE OF CORRECTION

PATENT NO. : 6,363,042 B1
DATED : March 26, 2002
INVENTOR(S) : Mitsunori Sakashita It is certified that error appears in the above-identified patent and that said Letters Patent is hereby corrected as shown below:

Column 9,
Line 3, delete "an voltage-controlled" and substitute -- a voltage-controlled -- in its place.

Signed and Sealed this

Twentieth Day of August, 2002

Attest:

JAMES E. ROGAN
Attesting Officer  Director of the United States Patent and Trademark Office